Patented Aug. 4, 1931

1,817,664

UNITED STATES PATENT OFFICE

BERNARD B. BADANES, OF WOODSIDE, NEW YORK

DENTIFRICE

No Drawing.  Application filed October 26, 1928. Serial No. 315,352.

This invention relates to improvements in dentifrices and has for one of its objects to provide an improved dental compound which has the ability to help to prevent the formation of tartar and dissolve it when freshly formed by dissolving the three basal organic binding substances, to wit, calcium oxalate, mucin, and globulin, thereby disintegrating the inorganic materials which constitute tartar and to assist in preventing some cases of pyorrhea by lessening the irritation at the gum margins when due to tartar accretion, to lessen inflammation of the gum and to restrain bacterial activity by dissolving globulin and preventing the precipitation of mucin which entangle micro-organisms together with inorganic calcium salts when they are precipitated in the saliva.

In carrying out the invention, any good tooth-paste, whether it be alkaline or mildly acid, may be employed. As an example of an average alkaline dentifrice, the following formula may be used—

|  | Per cent |
|---|---|
| Precipitated chalk (calcium carbonate $CaCO_3$) or milk of magnesia $Mg(OH_2)$, or magnesium carbonate $(MgCO_3)$ | 65 |
| Glycerine | 20 |
| Flavoring (oil of peppermint, eucalyptol, thymol, menthol, oil of wintergreen | 5 |
| Water | 10 | or the following may be employed as an average acid formula—

|  | Per cent |
|---|---|
| Acid calcium phosphate $(CaHPO_4)$ | 25 |
| Tri-calcium phosphate $(Ca_3(PO_4)_2)$ | 25 |
| Calcium chloride $(CaCl_2)$ | ½ |
| Anhydrous calcium sulphate $(CaSO_4)$ | 2 |
| Gylcerine | 30 |
| Water | 12½ |
| Flavorings | 5 |

To either of the above formulæ, or ones of a similar nature, there are added quantities of one or more soluble magnesium salts, such as magnesium chloride and magnesium sulphate, each in amounts not exceeding 0.5% of the total mass. While a mixture of magnesium sulphate and magnesium chloride, or other neutral salts, may be used in amounts not exceeding 0.5% each, the total proportion of such salts should not exceed 1% of the total mass. The main purpose of adding magnesium sulphate to a tooth-paste is to improve its functions to keep the teeth clean. While other neutral salts of magnesia may be used in varying quantities their solvent action is less efficacious. These neutral salts have been found to be the only non-injurious substances which will act as an efficient preventive against the formation of tartar on the teeth and a solvent therefor when freshly formed. The magnesium sulphate will also dissolve the calcium oxalate (in the proportion 1:90) which is generated by the combination of oxalic acid from vegetable foods or from metabolic sub-oxidation with some of the calcium salts of the saliva, resulting in—

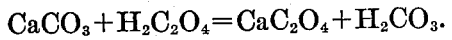
$$CaCO_3 + H_2C_2O_4 = CaC_2O_4 + H_2CO_3.$$

The result of the reaction of the magnesium sulphate on the calcium oxalate is represented by

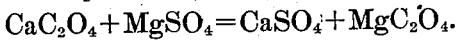
$$CaC_2O_4 + MgSO_4 = CaSO_4 + MgC_2O_4.$$

The insoluble calcium oxalate is thereby converted into magnesium oxalate which is soluble. The resulting calcium sulphate acts as a polishing agent for the teeth.

The salts used also act to dissolve and to prevent the precipitation of proteins and their combinations which are insoluble in pure water, such as globulin and mucin, which are the principal organic binding substances in salivary calculus, a concretion consisting chiefly of carbonates of lime and magnesia and phosphate of lime. The dissolution of the mucin inhibits bacterial activity which would otherwise occur when inorganic calcium salts are precipitated in saliva.

Further, the substances employed herein lessen irritation at the gum margin resulting from tartar accretion and the magnesium sulphate, or the like, assists in eliminating inflammation of the gums by its antiphlogistic action.

Both of the salts used, being neutral, will not draw on the reserve alkalinity of the blood nor stop the amylolytic activity of ptyalin which acts as a ferment on starch to rapidly convert it into dextrose. Further, the soluble magnesium oxalate resulting from the double decomposition of calcium oxalate with magnesium sulphate will act to remove fresh smoke stains from the teeth when used with friction of a tooth-brush.

It has also been found that the magnesium chloride acts as a softening agent for the dentifrice to assist in preventing the same from becoming hard. Therefore, by employing this ingredient, the amount of glycerine used may be reduced.

Further, the use of neutral salts of magnesia, when taken internally in solution, will dissolve urinary calculi when wholly or partially composed of calcium oxalate.

What is claimed is:

1. A dentifrice containing a water soluble inorganic magnesium salt not exceeding 1 per cent and adapted to remove freshly formed tartar.

2. A dentifrice including magnesium sulphate approximately 0.5 per cent which will react on calcium oxalate and globulin contained in freshly formed tartar to dissolve the same and on mucin also contained in freshly formed tartar to prevent precipitation thereof.

In testimony whereof I have affixed my signature.

BERNARD B. BADANES.